(12) United States Patent
Maruyama et al.

(10) Patent No.: US 6,982,838 B2
(45) Date of Patent: Jan. 3, 2006

(54) OBJECTIVE LENS FOR OPTICAL PICK-UP

(75) Inventors: Koichi Maruyama, Tokyo (JP); Daisuke Koreeda, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/859,140

(22) Filed: Jun. 3, 2004

(65) Prior Publication Data

US 2004/0246873 A1 Dec. 9, 2004

(30) Foreign Application Priority Data

Jun. 4, 2003 (JP) ............................. 2003-159309

(51) Int. Cl.
  *G02B 3/02* (2006.01)
  *G02B 13/18* (2006.01)
  *G02B 3/08* (2006.01)
  *G11B 7/00* (2006.01)
  *G11B 7/135* (2006.01)

(52) U.S. Cl. .................. 359/719; 359/742; 369/44.23; 369/112.03

(58) Field of Classification Search ................ 359/719, 359/708, 742; 369/112.03, 112.05, 112.07, 369/44.23, 44.37, 44.38
See application file for complete search history.

(56) References Cited

U.S. PATENT DOCUMENTS

| 6,118,594 A | 9/2000 | Maruyama |
| 6,449,095 B1 | 9/2002 | Ohtaki et al. |
| 6,587,272 B2 | 7/2003 | Nakai |
| 2001/0008513 A1 | 7/2001 | Arai et al. |
| 2004/0156301 A1 * | 8/2004 | Ikenaka .................. 369/112.17 |
| 2004/0213131 A1 * | 10/2004 | Kimura et al. ......... 369/112.03 |

FOREIGN PATENT DOCUMENTS

| JP | 2000-75118 | 3/2000 |
| JP | 2000-81566 | 3/2000 |
| JP | 2001-93179 | 4/2001 |
| JP | 2001-195769 | 7/2001 |

* cited by examiner

*Primary Examiner*—Georgia Epps
*Assistant Examiner*—Alicia M. Harrington
(74) *Attorney, Agent, or Firm*—Greenblum & Bernstein, P.L.C.

(57) ABSTRACT

There is provided an objective lens used for at least three types of optical discs when thicknesses are respectively represented by t1, t2 and t3, t1 as 0.6 mm, t2 is 0.6 mm and t3 is 1.2 mm. When numerical apertures for the first, second and third optical discs are respectively represented by NA1, NA2 and NA3, a relationship NA1>NA2>NA3 is satisfied. When the first and second optical discs are used, collimated light beams are incident on the objective lens. When the third optical disc is used, a diverging beam is incident on the objective lens. The following conditions are satisfied: $-0.02<f1\times M1<0.02$ * * * (1), $-0.02<f2\times M2<0.02$ * * * (2), and $-0.29<f3\times M3<-0.19$ * * * (3). The objective lens includes a diffracting structure having the first region configured such that a diffraction order at which diffraction efficiency of a first light beam is maximized is a second order and the diffraction orders at which diffraction efficiency of second and third light beams are maximized are first orders.

13 Claims, 7 Drawing Sheets

SPHERICAL ABERRATION

−0.005　0.005

SPHERICAL ABERRATION

−0.005　0.005

SPHERICAL ABERRATION

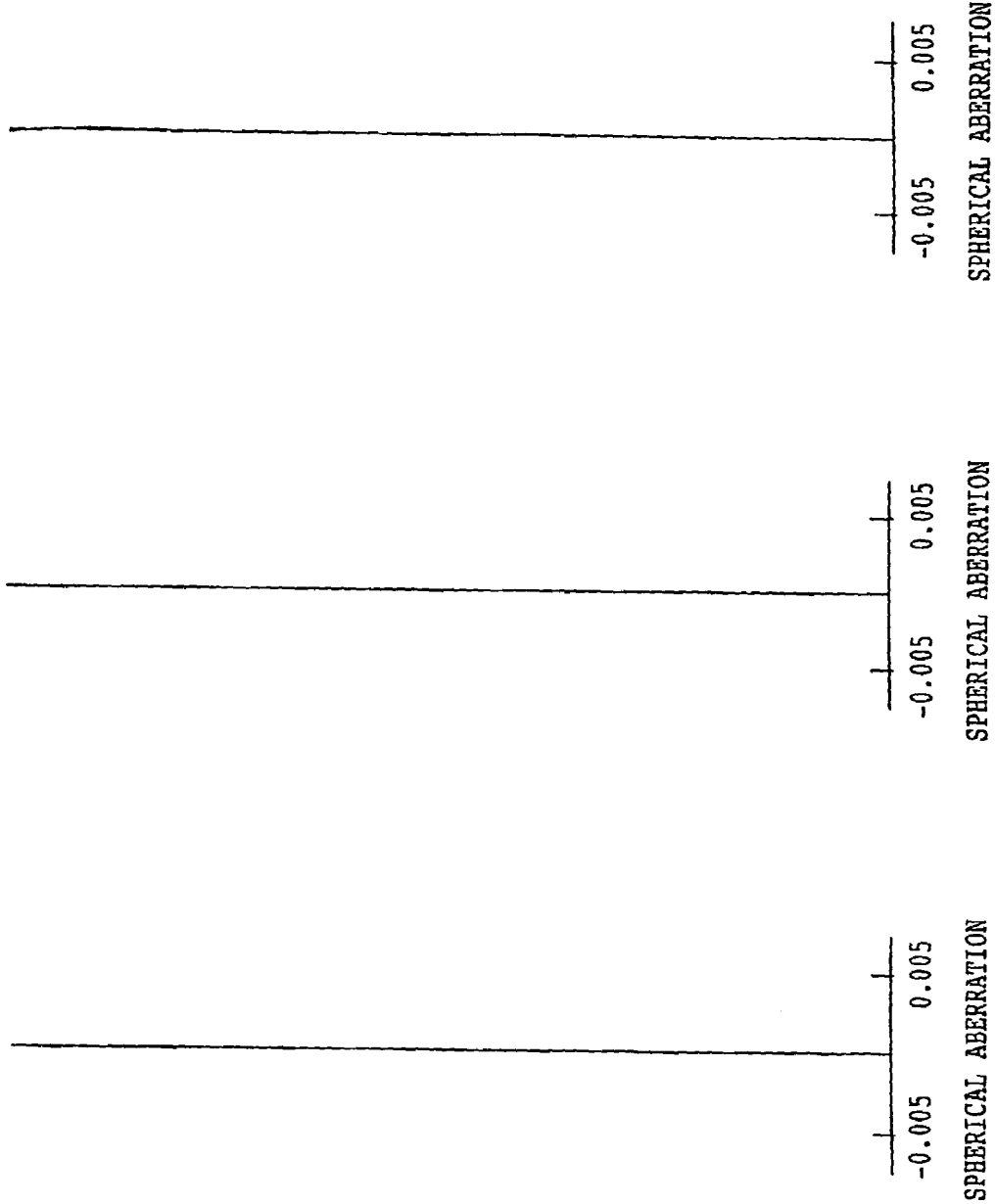

OBJECTIVE LENS FOR OPTICAL PICK-UP

BACKGROUND OF THE INVENTION

The present invention relates to an objective lens for an optical pick-up used for an optical disc drive, which is capable of recording data to and/or reproducing data from a plurality of types of optical discs having different recording densities and having different thicknesses of cover layers.

There are various types of optical discs on which digital information is recorded at various densities, respectively. For example, a DVD (digital versatile disc) has a recording density higher that that of a CD (compact disc) or a CD-R (CD Recordable) and has a cover layer thinner than that of the CD or CD-R.

When the recording/reproducing for the DVD having a higher recording density is performed, a smaller beam spot diameter is required on the data recording layer of the DVD relative to a beam spot used for the CD having a lower recording density. For this reason, the optical pick-up is configured such that a NA (numerical aperture) is changed to a higher value to obtain a smaller beam spot diameter when the DVD is used and that the NA is changed to a lower value to obtain a larger beam spot diameter when the CD or CD-R is used.

The diameter of the beam spot decreases as a wavelength of the laser beam decreases. Therefore, in general, a laser beam having a wavelength of about 660 nm, which is shorter than a wavelength of about 780 nm for the CD, is used for the DVD.

A condition of a spherical aberration in an optical system of the optical pick-up changes depending on a thickness of the cover layer of the optical disc being used. Therefore, it is required to correct the spherical aberration caused when the optical disc is changed to another one having different thickness of cover layer.

Japanese Patent Provisional Publication No. 2000-81566 discloses a CD/DVD compatible objective lens (i.e., an objective lens of an optical pick-up that can be used for both of the DVD and CD). The CD/DVD compatible objective lens has a diffracting structure on one of its lens surfaces. The diffracting structure has a plurality of concentric ring-shaped steps having a function of properly converging an incident beam on a data recording layer of an optical disc regardless of the thickness of the cover layer of the optical disc being used.

That is, the diffracting structure has wavelength dependence such that the spherical aberration changes when the wavelength of the incident beam changes. Consequently, the CD/DVD compatible objective lens is capable of supporting various types of optical discs having different thicknesses of the cover layers.

More specifically, the lens surface on which the diffracting structure is formed has an inner area which provides an NA required for the optical disc having relatively low recording density (e.g., CD), and an outer area which is situated outside the inner area and which provides an NA required for the optical disc having relatively high recording density (e.g., DVD).

The diffracting structure within the inner area has a function that the laser beam for the CD is properly converged on the data recording layer of the CD and that the laser beam for the DVD is properly converged on the data recording layer of the DVD. The diffracting structure within the outer area has a function that the laser beam for the CD does not contribute to the formation of the beam spot for the CD and the laser beam for the DVD is most properly converged on the data recording layer of the DVD.

With the above mentioned structure, with regard to the laser beam for CD, only the laser beam passed through the inner area is properly converged on the data recording layer of the CD, while the laser beam passed through the outer area diffuses on the data recording layer of the CD. Consequently, the beam spot having relatively large diameter is formed on the data recording layer of the CD.

With regard to the beam for DVD, both of the inner and outer areas converge the laser beam passing therethrough on the data recording layer of the DVD. Consequently, the beam spot having relatively small diameter is formed on the data recording layer of the DVD.

Recently, new technical standards concerning optical discs having further higher recording densities are proposed. One of such optical discs is an HD DVD (High Definition DVD) having a recording density higher than that of the DVD. The HD DVD has a thickness of the cover layer smaller than or equal to that of the DVD. For the HD DVD, the laser beam having a wavelength shorter than that of the DVD (a so-called blue laser) is required.

Against the background of the start of the practical use of the optical discs having further higher recording densities such as an HD DVD, the demand for optical disc devices which can provide compatibility among existing optical discs (e.g., CD and DVD) and the optical discs of the new technical standards (e.g., HD DVD) is increasing. To accomplish such an optical disc device, an objective lens that is capable of converging incident beam on the data recording layers of various types of optical discs including the CD, DVD and HD DVD is required.

However, the objective lens disclosed in the publication No. 2000-81566 is not configured to support the HD DVD. That is, when the blue laser beam is incident on the objective lens disclosed in the publication, aberrations including a spherical aberration are caused and therefore a beam spot suitable for the recordation and the reproduction of data of the HD DVD can not be formed.

Japanese Patent Provisional Publication No. 2001-93179 discloses an objective lens configured to support the DVD and the HD DVD. However, the objective lens disclosed in the publication No. 2001-93179 is not configured to support the CD.

SUMMARY OF THE INVENTION

The present invention is advantageous in that it provides an objective lens of an optical pick-up which is capable of converging an incident beam on data recording layers of various types of optical discs including existing optical discs and an HD DVD.

According to an aspect of the invention, there is provided an objective lens for an optical pick-up which is used to record data to and/or to reproduce data from at least three types of optical discs by selectively using one of at least three light beams having different wavelengths, the at least three types of optical discs having at least two different thicknesses of cover layers.

In this structure, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 is substantially equal to 0.6 mm, t2 is substantially equal to 0.6 mm, and t3 is substantially equal to 1.2 mm.

Further, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≦NA2>NA3 is satisfied.

Further, when the first and second optical discs are used, substantially collimated light beams of the first and second light beams are incident on the objective lens, respectively, and when the third optical disc is used, a diverging beam of the third light beam is incident on the objective lens. Given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the third optical disc is used, following conditions (1), (2) and (3) are satisfied:

$$-0.02 < f1 \times M1 < 0.02 \qquad (1)$$

$$-0.02 < f2 \times M2 < 0.02 \qquad (2)$$

$$-0.29 < f3 \times M3 < -0.19 \qquad (3).$$

Further, at least one of lens surfaces of the objective lens includes a diffracting structure having a first region for converging the third light beam on a data recording layer of the third optical disc. The diffracting structure within the first region is configured such that a diffraction order at which diffraction efficiency of the first light beam is maximized is a second order and that diffraction orders at which diffraction efficiency of the second and third light beams are maximized are first orders.

In the above mentioned configuration, the first optical disc is, for example, an optical disc based on the new technical standard which requires the blue laser for recording data and/or reproducing data. The second optical disc is, for example, a DVD. The third optical disc is, for example, a CD.

Since the substantially collimated light beam is incident on the objective lens when each of the first and second light beams is used, the diverging beam is incident on the objective lens when the third light beam is used, and the diffracting structure is formed on one of the lens surfaces of the objective lens, the first, second and third light beams can be properly converged on the data recording layers of the first, second and third-optical discs, respectively, and the usage efficiency of the first, second and third light beams can be kept at a high level.

Each of FIGS. 1A, 1B, 1C and 1D is a graph showing a change of the diffraction efficiency for each of the first, second and third light beams with respect to a height of each step formed between adjacent annular zones in the diffracting structure. FIGS. 1A, 1B, 1C and 1D show the diffraction efficiency for a zero order, first order, second order and third order of diffracted light, respectively.

In each of FIGS. 1A, 1B, 1C and 1D, a curve of the diffraction efficiency for the first light beam having the wavelength (a first wavelength) for the first optical disc is represented by a solid line, a curve of the diffraction efficiency for the second light beam having the wavelength (a second wavelength) for the second optical disc is represented by a dashed line, and a curve of the diffraction efficiency for the third light beam having the wavelength (a third wavelength) for the third optical disc is represented by a chain line.

In each of FIGS. 1A, 1B, 1C and 1D, a line L1 represents the height of the step corresponding to 1λ, (λ is the first wavelength of the first light beam), a line L2 represents the height of the step corresponding to 2λ, and a line. L3 represents the height of the step corresponding to 3λ.

It is understood from the line L2 shown together with the graphs of FIGS. 1A, 1B, 1C and 1D that if the diffracting structure formed within the first region is configured such that the diffraction order at which the diffraction efficiency is maximized is the second order for the first light beam, then the diffraction order at which the diffraction efficiency is maximized becomes the first order for each of the second and third light beams.

By setting the diffraction order to the second order for the first light beam and setting the diffraction order to the first order for each of the second and third light beams, a sufficient amount of light required for recording data to and/or reproducing data from each of the first, second and third optical discs is attained on each of the data recording layers of the first, second and third optical discs.

With regard to a conventional CD/DVD compatible objective lens that supports recording operation and/or reproducing operation only for the CD and DVD, the spherical aberration can be corrected for two different wavelengths by forming a diffraction structure on a lens surface of the CD/DVD compatible objective lens. However, if three different wavelengths are required, the spherical aberration can not be corrected for all of the three different wavelengths due to a shortage of degrees of freedom concerning a lens design. To solve such a problem, the objective lens according to the above mentioned aspect of the invention is configured such that the spherical aberration is corrected by the diffracting structure for two of the three different wavelengths and that, with regard to the remaining one wavelength, the spherical aberration is corrected by changing the degree of divergence of the beam being incident on the objective lens.

When the wavelengths of the first and third light beams are about 405 nm and about 780 nm, respectively, a relative spherical aberration between the first wavelength and the third wavelength can not be corrected by the diffracting structure. The reason is that since power of a diffraction lens (i.e., the diffracting structure) is represented by m×λ/d (where m represents a diffraction order, λ represents a wavelength, and d represents a pitch of a diffraction grating), the power of the diffracting structure for the second order diffracted light of the first light beam becomes equal to the power of the diffracting structure for the first order diffracted light of the third light beam. For this reason, as described above, with regard to the third light beam, the diverging beam is used to correct the spherical aberration.

When a finite optical system is used in the optical pick-up, an aberration condition may be deteriorated due to an occurrence of a coma of an off-axis ray by a tracking operation. In addition, a tolerance to the aberration condition becomes lower as the required numerical aperture increases.

For this reason, the objective lens according to the above mentioned aspect of the invention is used in a situation where the substantially collimated light beam is incident on the objective lens when one of the first and second optical discs, each of which requires a relatively high numerical aperture, is used, and the diverging beam is incident on the objective lens when the third optical disc, which requires a relatively low numerical aperture, is used. With this structure, even if the objective lens is shifted from a reference axis of the optical pick-up by the tracking operation, the amount of the coma and astigmatism caused when the first or second optical disc is used can be lowered to a negligible level.

An refractive index of a coupling lens, which may be used together with the objective lens in the optical pick-up, changes depending on a wavelength of the light beam being used. Therefore, when the optical pick-up is configured such that a common coupling lens is used for the first and second light beams and light sources emitting the first and second light beams are arranged on a common substrates (i.e., when the two light sources are located at the same distance from the objective lens), at least one of the first and second beams being incident on the objective lens becomes a diverging beam or a converging beam. For this reason, the objective lens according to the above mentioned aspect of the invention is configured to satisfy the conditions (1) and (2). By satisfying the conditions (1) and (2), the amount of the aberration caused by the tracking operation can be sufficiently reduced.

Further, the objective lens according to the above mentioned aspect of the invention is configured to satisfy the condition (3). By satisfying the condition (3), the spherical aberration is sufficiently corrected for the third optical disc. If the f3×M3 gets larger than the upper limit of the condition (3), an overcorrected spherical aberration remains. If the f3×M3 gets lower than the lower limit of the condition (3), an undercorrected spherical aberration occurs.

With the above mentioned configuration, the spherical aberration is sufficiently corrected for all of the first, second and third optical discs, and the suitable beam spot can be formed on each of the data recording layers of the first, second and third optical discs.

Optionally, the diffracting structure may have a second region which converges the first and second light beams on data recording layers of the first and second optical discs, respectively, and does not contribute to converging the third light beam. In this structure, the diffracting structure within the second region may be configured such that a diffraction order at which diffraction efficiency of the first light beam is maximized is a third order and that a diffraction order at which diffraction efficiency of the second light beam is maximized is a second order.

By forming the second region, the third light beam having the third wavelength can be diffused on the data recording layer of the third optical disc, and deterioration of a wavefront aberration of each of the first and second light beams caused by temperature variations can also be reduced.

It is understood from the line L3 shown together with the graphs of FIGS. 1A, 1B, 1C and 1D that if the diffracting structure formed within the second region is configured such that the diffraction order at which the diffraction efficiency is maximized is the third order for the first light beam, then the third light beam is diffused into a first order diffracted light and a second order diffracted light. Therefore, the second region does not contribute to the formation of the beam spot for the third light beam.

When temperature increases, an oscillation wavelength of a laser source increases and a refractive index of a plastic lens (a refractive lens) decreases. Therefore, when the refractive lens is corrected for the spherical aberration at a reference temperature, if temperature increases, an overcorrected spherical aberration occurs. To correct the overcorrected aberration caused by the temperature variations, the diffracting structure is required to generate an undercorrected spherical aberration.

In the diffracting structure formed within the first region, the diffraction order at which the diffraction efficiency is maximized is set at the second order for the first light beam and at the first order for the second and third light beams. Therefore, the power of the diffracting structure, defined by the m×λ/d, for the first light beam is larger than that for the second light beam. In order to cancel a difference between a spherical aberration caused by the refractive lens when the first wavelength is used and a spherical aberration caused by the refractive lens when the second wavelength is used, the diffracting structure in the first region is required to cause an over spherical aberration, caused when the first wavelength is used, relative to a spherical aberration caused when the second wavelength is used.

However, when the diffracting structure within the first region has the above mentioned configuration for correcting the spherical aberration, if temperature increases, the diffracting structure gives an over spherical aberration in addition to the overcorrected spherical aberration caused by the refractive lens due to the temperature increase from the reference temperature. The reason is that the diffracting structure in the first region has an optical performance that the spherical aberration changes to an overcorrected direction when the wavelength of the beam being used increases.

On the other hand, the second region is configured such that the diffraction order at which the diffraction efficiency is maximized is the third order for the first light beam and the second order for the second light beam. In the second region, the power of the diffracting structure, represented by m×λ/d, for the second light beam becomes larger than the power of the diffracting structure for the first light beam. When the diffracting structure is configured to generate a spherical aberration, caused when the second light beam having the second wavelength is used, under than a spherical aberration caused when the first laser beam having the first wavelength is used, the diffracting structure can correct the over corrected spherical aberration caused by the refractive lens due to the temperature increase from the reference temperature. The reason is that the diffracting structure in the second region has an optical performance that the spherical aberration changes to an undercorrected direction when the wavelength of the beam being used increases. Accordingly, deterioration of the wavefront aberration can be prevented for both of the first and second light beams by the second region.

Still optionally, the objective lens may satisfy a condition (4): f1×NA1>f2×NA2. In this case, the diffracting structure may have a third region which converges only the first light beam on the data recording layer of the first optical disc and which is located outside the second region. The diffracting structure within the third region is configured such that a diffraction order at which diffraction efficiency of the first light beam is maximized is different from the diffraction order at which the diffraction efficiency of the first light beam is maximized within the second region.

By forming the third region according to the above mentioned structure, each of the second and third light beams passing through the third region can be diffused. It is understood from the line L1 shown together with the graphs of FIGS. 1A, 1B, 1C and 1D that if the diffracting structure formed within the third region is configured such that the diffraction order at which the diffraction efficiency is maximized is the first order for the first light beam, then each of the second and third light beams is diffused into a zero order diffracted light and a first order diffracted light. Therefore, the contribution of the third region to the formation of the beam spot for each of the second and third light beams is reduced.

Alternatively, the objective lens may satisfy a condition (5): $f1 \times NA1 < f2 \times NA2$. In this case, the diffracting structure may have a third region which converges only the second light beam on the data recording layer of the second optical disc and which is located outside the second region. The diffracting structure within the third region is configured such that a diffraction order at which diffraction efficiency of the second light beam is maximized is different from the diffraction order at which the diffraction efficiency of the second light beam is maximized within the second region.

By forming the third region according to the above mentioned structure, each of the first and third light beams passing through the third-region can be diffused.

According to another aspect of the invention, there is provided an optical pick-up used for recording data to and/or reproducing data from at least three types of optical discs having at least two different thicknesses of cover layers. The optical pick-up includes light sources capable of emitting at least three light beams having different wavelengths, one of the at least three light beams being selectively emitted when one of the at least three types of optical discs is used, and an objective lens.

In this structure, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 is substantially equal to 0.6 μmm, t2 is substantially equal to 0.6 mm and t3 is substantially equal to 1.2 mm.

Further, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship $NA1 \leq NA2 > NA3$ is satisfied.

Further, when the first and second optical discs are used, substantially collimated light beams of the first and second light beams are incident on the objective lens, respectively, and when the third optical disc is used, a diverging beam of the third light beam is incident on the objective lens. Given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the first optical disc is used, following conditions (1), (2) and (3) are satisfied:

$$-0.02 < f1 \times M1 < 0.02 \quad (1)$$

$$-0.02 < f2 \times M2 < 0.02 \quad (2)$$

$$-0.29 < f3 \times M3 < -0.19 \quad (3).$$

Further, at least one of lens surfaces of the objective lens includes a diffracting structure having a first region for converging the third light beam on a data recording layer of the third optical disc. The diffracting structure within the first region is configured such that a diffraction order at which diffraction efficiency of the first light beam is maximized is a second order and that diffraction orders at which diffraction efficiency of the second and third light beams are maximized are first orders.

By the same reason described with reference to the objective lens according to the above mentioned aspect of the invention, in the optical pick-up according to the above mentioned another aspect of the invention, the spherical aberration is sufficiently corrected for all of the first, second and third optical discs, and the suitable beam spot can be formed on each of the data recording layers of the first, second and third optical discs.

Optionally, the diffracting structure may have a second region which converges the first and second light beams on data recording layers of the first and second optical discs, respectively, and does not contribute to converging the third light beam. In this structure, the diffracting structure within the second region may be configured such that a diffraction order at which diffraction efficiency of the first light beam is maximized is a third order and that a diffraction order at which diffraction efficiency of the second light beam is maximized is a second order.

Still optionally, the objective lens of the optical pick-up may satisfy a condition (4): $f1 \times NA1 > f2 \times NA2$. In this case, the diffracting structure of the objective lens may have a third region which converges only the first light beam on the data recording layer of the first optical disc and which is located outside the second region. The diffracting structure within the third region is configured such that a diffraction order at which diffraction efficiency of the first light beam is maximized is different from the diffraction order at which the diffraction efficiency of the first light beam is maximized within the second region.

Alternatively, the objective lens of the optical pick-up may satisfy a condition (5): $f1 \times NA1 < f2 \times NA2$. In this case, the diffracting structure of the objective lens may have a third region which converges only the second light beam on the data recording layer of the second optical disc and which is located outside the second region. The diffracting structure within the third region is configured such that a diffraction order at which diffraction efficiency of the second light beam is maximized is different from the diffraction order at which the diffraction efficiency of the second light beam is maximized within the second region.

Still optionally, when wavelengths of the first and third light beams are respectively represented by $\lambda 1$ and $\lambda 3$, and refractive indexes of the objective lens for the first and third light beams are respectively represented by n1 and n3, a following relationship may be satisfied:

$$\lambda 1/(n1-1):\lambda 3/(n3-1) \approx 1:2 \quad (6).$$

For the above mentioned two aspect of the invention, the first region may be located on the at least one of lens surfaces of the objective lens to include an optical axis of the objective lens.

For the above mentioned two aspect of the invention, the first region may be located on the at least one of lens surfaces of the objective lens to include an optical axis of the objective lens, and the second region may be formed outside the first region.

BRIEF DESCRIPTION OF THE ACCOMPANYING DRAWINGS

FIG. 9 is a graph showing the spherical aberration which is caused when the first optical disc is used in the optical pick-up according to the second example;

FIG. 10 is a graph showing the spherical aberration which is caused when the second optical disc is used in the optical pick-up according to the second example; and FIG. 11 is a graph showing the spherical aberration which is caused when the third optical disc is used in the optical pick-up according to the second example.

DETAILED DESCRIPTION OF THE EMBODIMENTS

Hereinafter, an embodiment according to the invention is described with reference to the accompanying drawings.

Figure 2:
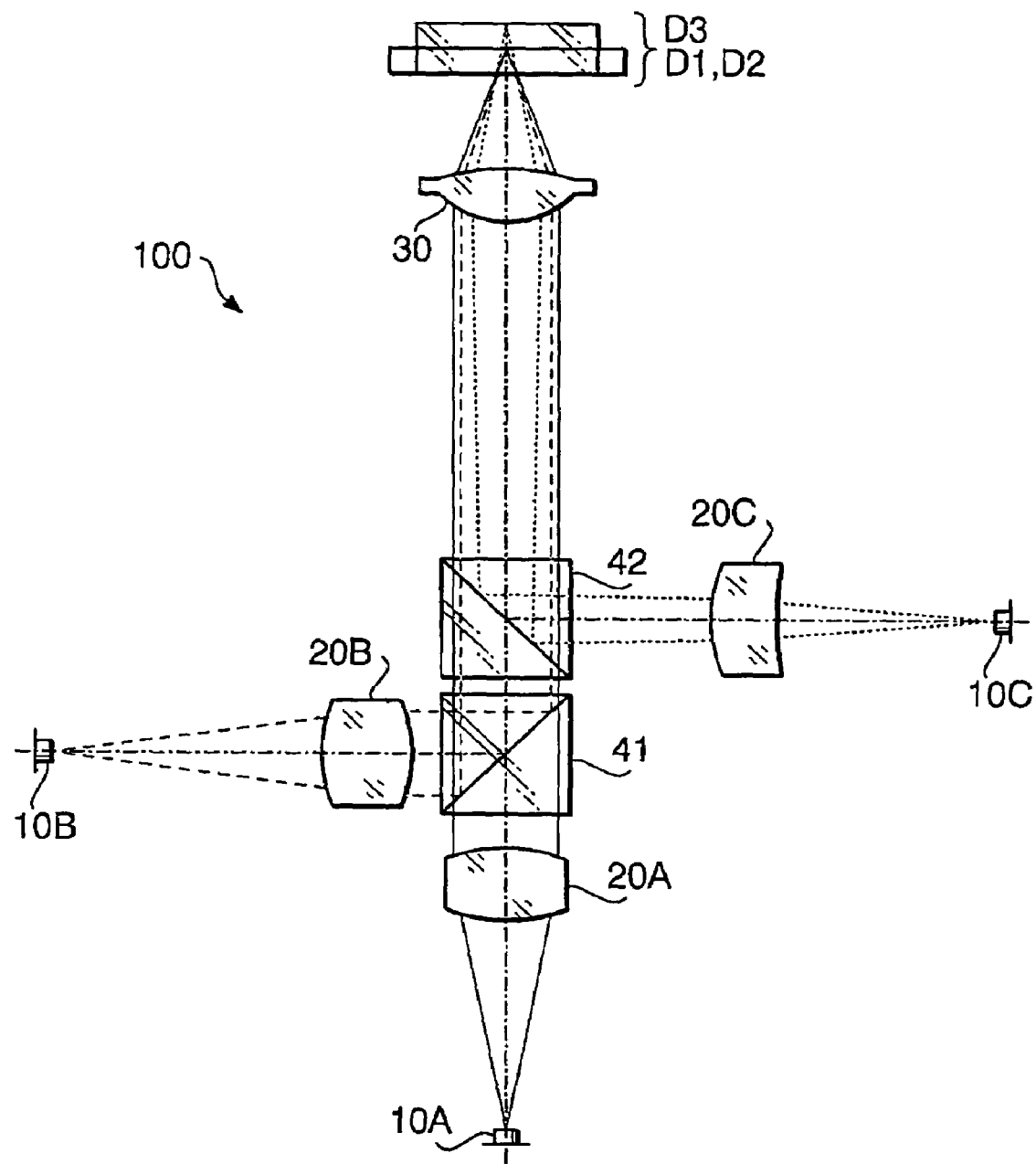
FIG. 2 shows a configuration of an optical pick-up according to an embodiment of the invention.

FIG. 2 shows a configuration of an optical pick-up 100 according to the embodiment of the invention. The optical pick-up 100 is mounted on an optical disc device which is capable of recording data to and/or reproducing data from optical discs D1, D2 and D3 which have different recording densities and different thicknesses of cover layers. In actuality, when the recordation or the reproduction operation is performed, one of optical discs D1, D2 and D3 is placed on a turn table (not shown) in the optical disc device.

In FIG. 2 (and each of FIGS. 3A–3C), a reference axis of the optical pick-up 100 is represented by a chain line, and laser beams emitted by light sources 10A, 10B and 10C are represented by a solid line, a dashed line, and a dotted line, respectively.

In this embodiment, the optical disc D1 has the highest recording density of all of the optical discs D1, D2 and D3. The optical disc D2 has the second highest recording density. The recording density of the optical disc D3 is the lowest of all of the optical discs D1, D2 and D3. The optical disc D1 is, for example, an HD DVD, the optical disc D2 is for example, a DVD or DVD-R, and the optical disc D3 is, for example, a CD or CD-R.

As shown in FIG. 2, the optical pick-up 100 includes the light sources 10A, 10B and 10C which are respectively used for the optical discs D1, D2 and D3, coupling lenses 20A, 20B and 20C, beam splitters 41 and 42, and an objective lens 30. Laser beams emitted by the light sources 10A, 10B and 10C pass through the coupling lenses 20A, 20B and 20C, respectively, and then directed to a common optical path by the beam splitters 41 and 42 to be incident on the objective lens 30. In the following explanation, the laser beam for the optical disc D1 is represented by a first laser beam, the laser beam for the optical disc D2 is represented by a second laser beam, and the laser beam for the optical disc D3 is represented by a third laser beam.

Each of the first, second and the third laser beams emerged from the beam splitter 42 is converged by the objective lens 30 on the recording layer of the corresponding optical disc. That is, when the optical disc D1 is used, the first laser beam is converged by the objective lens 30 on the data recording layer of the optical disc D1. When the optical disc D2 is used, the second laser beam is converged by the objective lens 30 on the data recording layer of the optical disc D2. When the optical disc D3 is used, the third laser beam is converged by the objective lens 30 on the data recording layer of the optical disc D3.

Figure 3A:
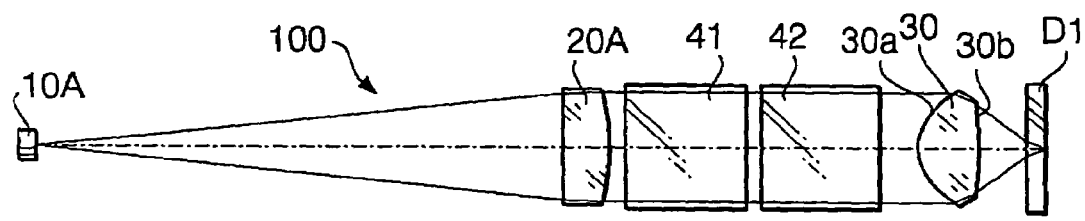
FIG. 3A shows the configuration of the optical pick-up when a first optical disc is used.
Figure 3B:
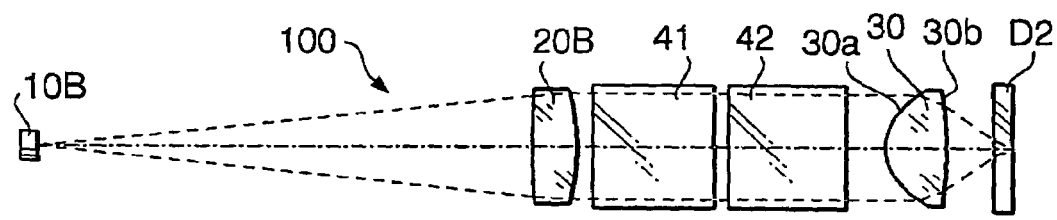
FIG. 3B shows the configuration of the optical pick-up when a second optical disc is used.
Figure 3C:
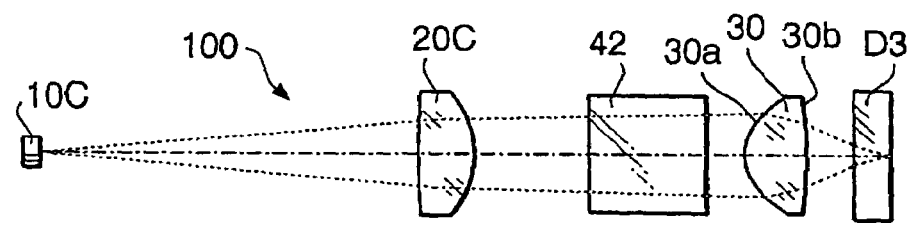
FIG. 3C shows the configuration of the optical pick-up when a third optical disc is used.

FIGS. 3A, 3B and 3C respectively show the configurations of the optical pick-up 100 when data is recorded to and/or reproduced from the optical discs D1, D2 and D3. Although in each of FIG. 2 and FIGS. 3A–3C, an optical axis of the objective lens 30 coincides with the reference axis of the optical pick-up 100, there is a case where the optical axis of the objective lens 30 shifts from the reference axis by, for example, a tracking operation.

In this embodiment, given that the thicknesses of cover layers of the optical discs D1, D2 and D3 are represented by t1, t2 and t3, respectively, t1≈0.6 mm, t2≈0.6 mm and t3≈1.2 mm.

It is required to change an NA (numerical aperture) in accordance with the type of the optical disc being used so as to attain required diameters of beam spots suitable for recording data to and/or reproducing data from one of the optical discs D1, D2 and D3. In this embodiment, given that the numerical apertures for recording data to and/or repro ducing data from the optical discs D1, D2 and D3 are NA1, NA2 and NA3, respectively, the following relationship holds.

$NA1 \leq NA2 > NA3$

The light source 10A is used for recording data to and/or reproducing data from the optical disc D1 having the highest recording density. To form the beam spot having the smallest diameter of all of the beam spots for the optical discs D1, D2 and D3, the light sources 10A is configured to emit the first laser beam having the shortest wavelength of all of wavelengths of the light sources 10A, 10B and 10C. The light source 10C is used for recording data to and/or reproducing data from the optical disc D3 having the lowest recording density. To form the beam spot having the largest diameter of all of the beam spots for the optical discs D1, D2 and D3, the light source 10C is configured to emit the third laser beam having the longest wavelength of all of wavelengths of the light sources 10A, 10B and 10C.

The light source 10B is used for recording data to and/or reproducing data from the optical disc D2 having the relatively high recording density. To form the beam spot having the relatively small diameter, the light source 10B is configured to emit the second laser beam having the second shortest wavelength of all of the wavelengths of the first through third laser beams.

In an example of the configuration shown in FIG. 2, the light sources 10A, 10B and 10C are located at positions different from one another. However, in another example, the light sources 10A, 10B and 10C may be arranged in positional relationships different from that shown in FIG. 2. For example, the light sources 10A, 10B and 10C may be aligned in a line on a common substrate.

The objective lens 30 is a biconvex single element lens made of plastic. The objective lens 30 has a first surface 30a located on a light source side and a second surface 30b. When the thicknesses of the cover layers of the optical discs D1 and D3 (D2 and D3) are different from each other and the wavelengths of the light beams for the optical discs D1, D2 and D3 are different from one another, a spherical aberration changes depending on the type of the optical disc being used.

Therefore, in this embodiment, to correct the spherical aberration for all of the optical discs D1, D2 and D3, the objective lens 30 is configured to have a diffracting structure on one of its lens surfaces. The diffracting structure has a plurality of annular zones concentrically arranged about the optical axis of the objective lens 30. That is, the diffracting structure has a plurality of concentric ring-shaped minute steps.

Figure 4:
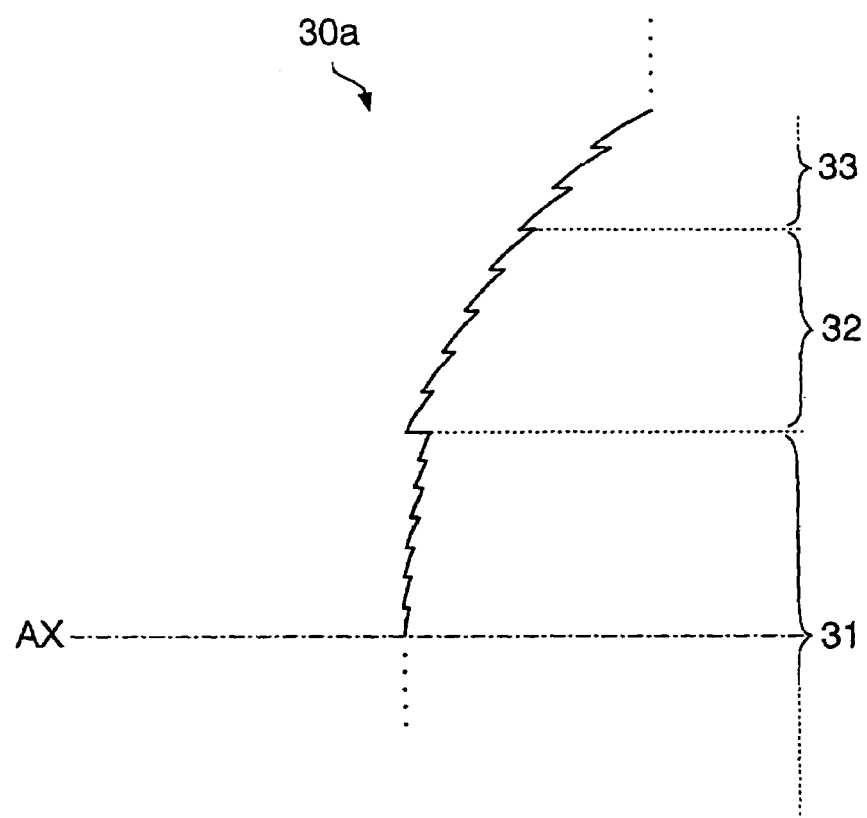
FIG. 4 is a cross sectional view of an objective lens of the optical pick-up illustrating a configuration of the diffracting structure when a diffracting structure is formed on a first surface of the objective lens.

FIG. 4 is a cross sectional view of the objective lens 30 illustrating a configuration of the diffracting structure when the diffracting structure is formed on the first surface 30A. As shown in FIG. 4, the first surface 30A is divided into a first region 31 including the optical axis of the objective lens 30, a second region 32 located outside the first region 31, and a third region 33 which is located outside the second region 32 and continues from the outermost portion of the second region 32 to the outermost portion (not shown in FIG. 4) of the first surface 30A.

As described in detail later, the diffracting structure formed within each of the first, second and third regions 31, 32 and 33 is configured such that each optical path difference given by the adjacent annular zones becomes about an integral multiple of a certain wavelength.

The diffracting structure formed within the first region 31 is configured such that the first, second and third laser beams are properly converged on the data recording layers of the optical discs D1, D2 and D3, respectively. More specifically, the diffracting structure formed within the first region 31 is configured such that the order of diffraction light having the highest diffraction efficiency is the second order for the first laser beam and is the first order for each of the second and third laser beams. The diffracting structure formed within the first region 31 has the function of canceling a change of the spherical aberration caused by a wavelength difference between the wavelength of the first laser beam and the wavelength of the second laser beam.

Each of FIGS. 1A, 1B, 1C and 1D is a graph showing a change of the diffraction efficiency for each of the first, second and third laser beams with respect to a height of the step formed between the adjacent annular zones in the diffracting structure. FIGS. 1A, 1B, 1C and 1D show the diffraction efficiency for the zero order, first order, second order and third order of diffracted light, respectively.

In each of FIGS. 1A, 1B, 1C and 1D, a curve of the diffraction efficiency for the first laser beam having the wavelength (a first wavelength) for the optical disc D1 is represented by a solid line, a curve of the diffraction efficiency for the second laser beam having the wavelength (a second wavelength) for the optical disc D2 is represented by a dashed line, and a curve of the diffraction efficiency for the third laser beam having the wavelength (a third wavelength) for the optical disc D3 is represented by a chain line.

Figure 1A:
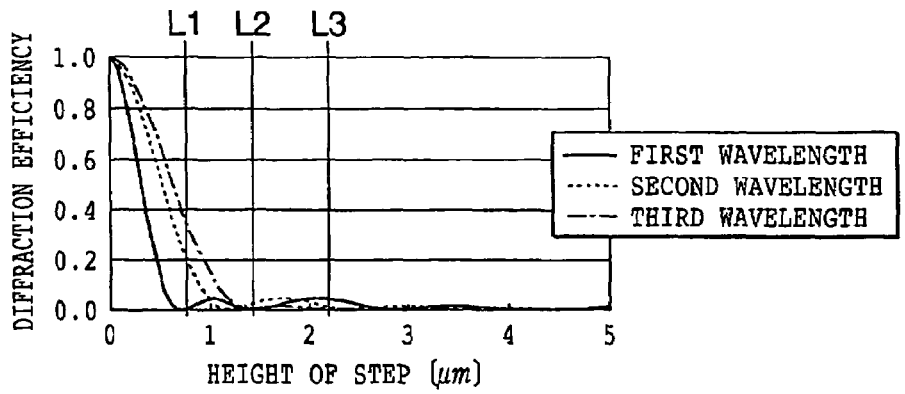
FIG. 1A is a graph showing a change of diffraction efficiency for each of a first, second and third laser beams with regard to a zero order diffracted light.
Figure 1B:
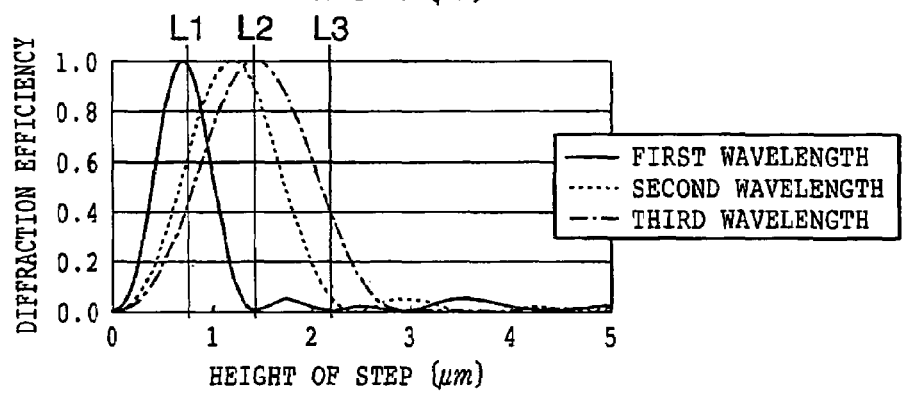
FIG. 1B is a graph showing a change of diffraction efficiency for each of a first, second and third laser beams with regard to a first order diffracted light.
Figure 1C:
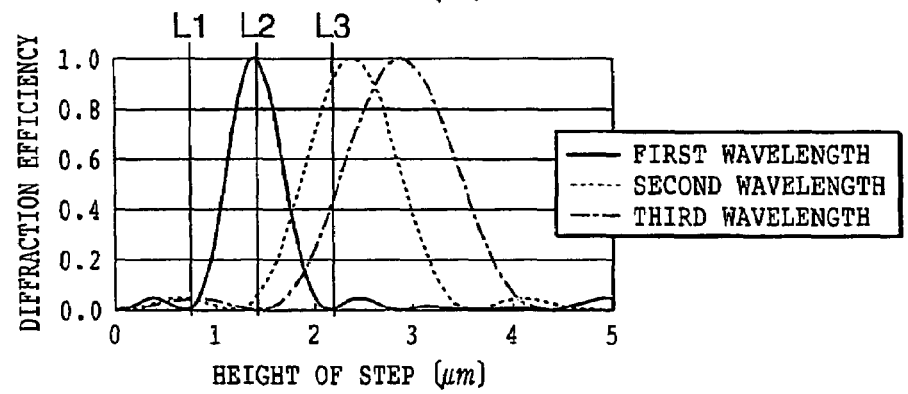
FIG. 1C is a graph showing a change of diffraction efficiency for each of a first, second and third laser beams with regard to a second order diffracted light.
Figure 1D:
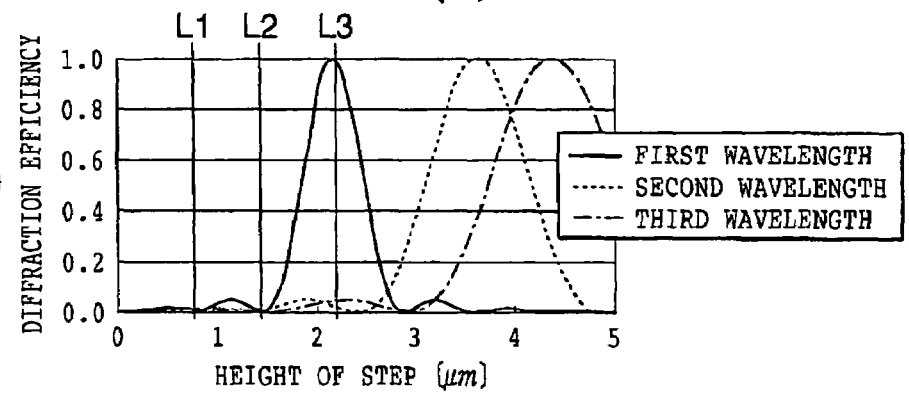
FIG. 1D is a graph showing a change of diffraction efficiency for each of a first, second and third laser beams with regard to a third order diffracted light.

In each of FIGS. 1A, 1B, IC and ID, a line L1 represents the height of the step corresponding to 1λ (λ is the first wavelength of the first laser beam), a line L2 represents the height of the step corresponding to 2λ, and a line L3 represents the height of the step corresponding to 3λ.

It is understood from the line L2 shown together with the graphs of FIGS. 1A, 1B, 1C and 1D that if the diffracting structure formed within the first region 31 is configured such that the diffraction order at which the diffraction efficiency is maximized is the second order for the first laser beam, then the diffraction order at which the diffraction efficiency is maximized becomes the first order for each of the second and third laser beams. It is noted that the objective lens 30 is made of, for example, material having a refractive index at d-ray of 1.5434 and Abbe Constant of 56.

In the diffracting structure formed within the first region 31, the optical path difference given by the adjacent annular zones is substantially equal to the wavelength of the third laser beam. That is, the first region 31 has an advantage in that it provides high usage efficiency for the third laser beam.

The diffracting structure formed within the second region 32 is configured such that the first and second laser beams are properly converged on each of the recording layers of the optical discs D1 and D2, respectively, without causing aberrations. The order of diffraction light which has the highest diffraction efficiency is set at the third order for the first laser beam and is set at the second order for the second laser beam.

That is, the diffracting structure formed within the second region 32 has the height of each step corresponding to the line L3 shown in each of FIGS. 1A, 1B, 1C and 1D.

Because of the above mentioned configuration of the second region 32, a phase of a wavefront of the third laser beam passed through the second region 32 does not coincide with a phase of a wavefront of the third laser beam passed through the first region 31. Accordingly, the second region 32 does not contribute to the formation of the beam spot of the third laser beam.

The third region 33 is formed on the first surface 30a when the following condition (4) or condition (5) of the objective lens 30 is satisfied.

$$f1 \times NA1 > f2 \times NA2 \quad (4)$$

$$f1 \times NA1 < f2 \times NA2 \quad (5)$$

In the conditions (4) and (5), f1 represents a focal length of the objective lens 30 when the optical disc D1 is used, f2 represents the focal length of the objective lens 30 when the optical disc D2 is used.

The diffracting structure formed within the third region 33 which is formed when the objective lens 30 satisfies the condition (4) is configured such that the first laser beam is suitably converged on the data recording layer of the optical disc D1 without causing the aberrations, and is configured not to contribute to the formation of the beam spot for the second laser beam.

More specifically, the diffracting structure formed within the third region 33 when the objective lens 30 satisfies the condition (4) is configured such that the order of diffracted light which has the highest diffraction efficiency for the first laser beam is different from the order of diffracted light which has the highest diffraction efficiency for the first laser beam within the second region 32. The third region 33 is blazed so that the diffraction efficiency of the first laser beam is maximized.

The diffracting structure formed within the third region 33 which is formed when the objective lens 30 satisfies the condition (5) is configured such that the second laser beam is suitably converged on the data recording layer of the optical disc D2 without causing the aberrations, and is configured not to contribute to the formation of the beam spot for the first laser beam.

More specifically, the diffracting structure formed within the third region 33 when the objective lens 30 satisfies the condition (5) is configured such that the order of diffracted light which has the highest diffraction efficiency for the second laser beam is different from the order of diffracted light which has the highest diffraction efficiency for the second laser beam within the second region 32. The third region 33 is blazed so that the diffraction efficiency for the second laser beam is maximized.

By designing the diffracting structure (i.e., the first, second and third regions 31, 32 and 33) to have the above mentioned configuration, the numerical apertures (NA1, NA2 and NA3) suitable for the optical disc D1, D2 and D3, respectively, can be attained.

As described above, when the objective lens 30 is positioned along the reference axis of the optical pick-up 100, the first and second laser beams (for the optical discs D1 and D2) are suitably converged on the data recording layers of the optical discs D1 and D2, respectively, without causing aberrations.

However, when the objective lens 30 shifts from the reference axis due to the tracking operation, off-axis light is incident on the objective lens 30. In this case, if a diverging beam is incident on the objective lens 30, a coma is caused. In general, the higher the numerical aperture required for the recordation or the reproduction for the optical disc becomes, the lower a tolerance to the aberration becomes.

To prevent the occurrence of the aberrations including a coma caused when the off-axis light is incident on the objective lens 30 during the tracking operation, in this embodiment each of the first and second laser beams is collimated before being incident on the objective lens 30.

More specifically, given that magnification of the objective lens 30 is represented by M1 and a focal length of the objective lens 30 is represented by f1 when the optical disc D1 is used, and given that magnification of the objective lens 30 is represented by M2 and a focal length of the objective lens 30 is represented by f2 when the optical disc D2 is used, the objective lens 30 satisfies the flowing conditions (1) and (2).

$$-0.02 < f1 \times M1 < 0.02 \quad (1)$$

$$-0.02 < f2 \times M2 < 0.02 \quad (2)$$

By designing the objective lens 30 to satisfy the conditions (1) and (2), the aberrations including a coma and astigmatism caused by the tracking operation when the optical disc D1 or D2 is used can be sufficiently corrected.

In this embodiment, the light sources 10A and 10B are positioned so that the first and second laser beams are converted to collimated light beams by the coupling lenses 20A and 20B, respectively. By thus arranging the light sources 10A and 10B, the magnification of the objective lens 30 is set at zero when the optical disc D1 or D2 is used. That is, the coupling lenses 20A and 20B function as collimator lenses.

Since the objective lens 30 is configured to prevent the occurrence of the aberrations when each of the optical discs D1 and D2 is used, it becomes difficult to correct spherical aberration which is caused when the optical disc D3 is used. In this embodiment, the spherical aberration which is caused when the optical disc D3 is used is corrected by making the laser beam incident on the objective lens 30 a diverging beam.

More specifically, given that magnification of the objective lens 30 is represented by M3 and a focal length of the objective lens 30 is represented by f3 when the optical disc D3 is used, the objective lens D3 satisfies the following condition (3).

$$-0.29 < f3 \times M3 < -0.19 \quad (3)$$

By designing the objective lens 30 to satisfy the condition (3), the spherical aberration caused when the optical disc D3 is used can be sufficiently corrected.

As described above, only the first region 31 of the objective lens 30 contributes to the formation of the beam spot when the recordation or reproduction for the optical disc D3 is performed. Therefore, it is desired that the diffracting structure within the first region 31 has the high usage efficiency for the third laser beam.

Since in this embodiment the second order diffracted light is used for the first laser beam within the first region 31, the optical path difference given by the adjacent annular zones is substantially equal to the wavelength of the third laser beam. Accordingly, it is possible to enhance the usage efficiencies of the first and third laser beams within the first region 31 by blazing the diffracting structure within the first region 31 at a wavelength twice as large as the wavelength of the first laser beam.

The diffracting structure formed in the vicinity of the optical axis of the objective lens 30 within the first region 31 may be configured to be blazed at a wavelength nearly equal to the wavelength of the second laser beam to enhance the usage efficiency of the second laser beam.

According to the above mentioned configuration, when the optical disc D1 is used, optical components in the optical pick-up 100 are arranged as shown in FIG. 3A, and the suitable beam spot is formed on the data recording layer of the optical disc D1. When the optical disc D2 is used, the optical components in the optical pick-up 100 are arranged as shown in FIG. 3B, and the suitable beam spot is formed on the data recording layer of the optical disc D2. Also, when the optical disc D3 is used, the optical components in the optical pick-up 100 are arranged as shown in FIG. 3C, and the suitable beam spot is formed on the data recording layer of the optical disc D3.

In this embodiment, the following relationship (6) is satisfied:

$$\lambda 1/(n1-1):\lambda 3/(n3-1) \approx 1:2 \qquad (6)$$

where $\lambda 1$ represents the wavelength of the first laser beam, n1 represents a refractive index of the objective lens 30 for the first laser beam, $\lambda 3$ represents the wavelength of the third laser beam, and n3 represents a refractive index of the objective lens 30 for the third laser beam.

When the relationship (6) holds, if the diffraction order for the first laser beam is set at the second order and if the diffraction order for the third laser beam is set at the first order, it becomes impossible to correct the spherical aberration by a diffracting lens structure for both of the first and third laser beams. More specifically, because the diffracting lens structure has the same power for both of the second order diffracted light of the laser beam having the wavelength of $\lambda 1$ and the first order diffracted light of the light beam having the wavelength of $\lambda 3$, the spherical aberration, which changes between the optical disc D1 and the optical disc D3 due to the change of the refractive index (caused by a difference of the wavelengths of the first and third laser beams) and the difference of the thicknesses of the cover layers of the optical discs D1 and D3, can not be corrected.

For this reason, in this embodiment, when each of the optical discs D1 and D2, each of which has a high recording density and requires the strict tolerance to the aberrations, is used, the aberrations are substantially completely corrected by the diffracting structure formed on the first surface 30a of the objective lens 30. On the other hand, when the optical disc D3 is used, the aberrations are corrected by utilizing the diffracting structure and the magnification of the objective lens 30.

In other words, according to the embodiment, even though a relationship among the wavelengths of the first, second and third laser beams is in a condition where the correction of the aberrations by the diffracting structure for all of the optical discs D1, D2 and D3 is very difficult, the suitable beam spot can be formed for all of the optical discs D1, D2 and D3.

The objective lens 30 (or the optical pick-up 100) can be represented as a lens (an apparatus) compatible for optical discs having the relationship (6).

Hereafter, two concrete examples of optical pick-ups according to the embodiment will be described. In the following examples, the thickness of the cover layers of the optical discs D1 and D2 are 0.6 mm, and the thickness of the cover layer of the optical disc D3 is 1.2 mm.

FIRST EXAMPLE

The optical pick-up 100 according to a first example will be described. FIG. 3A shows the configuration of the optical pick-up 100 according to the first example when the optical disc D1 is used, FIG. 3B shows the configuration of the optical pick-up 100 according to the first example when the optical disc D2 is used, and FIG. 3C shows the configuration of the optical pick-up 100 according to the first example.

Performance specifications of the objective lens 30 according to the first example are shown in Table 1.

TABLE 1

|  | First laser beam | Second laser beam | Third laser beam |
|---|---|---|---|
| Design wavelength | 405 nm | 657 nm | 785 nm |
| f Focal length | 3.001 | 3.109 | 3.126 |
| NA | 0.650 | 0.601 | 0.451 |
| magnification | 0.000 | 0.000 | −0.074 |

In Table 1, the design wavelength is a wavelength suitable for the recordation/reproduction of the optical disc, f represents a focal length (unit: mm) of the objective lens 30, NA represents the numerical aperture on an image side. In Table 1, the performance specifications are indicated with regard to each of the first laser beam (the optical disc D1), the second laser beam (the optical disc D2) and the third laser beam (the optical disc D3).

Table 2 shows a numerical configuration of the optical pick-up 100 when the optical disc D1 (the first laser beam) is used, Table 3 shows a numerical configuration of the optical pick-up 100 when the optical disc D2 (the second laser beam) is used, and Table 4 shows a numerical configuration of the optical pick-up 100 when the optical disc D3 (the third laser beam) is used.

TABLE 2

| Surface Number | r | d | n (405 nm) | n (657 nm) | n (785 nm) |
|---|---|---|---|---|---|
| #0 |  | 17.10 |  |  |  |
| #1 | 159.120 | 1.50 | 1.56023 | 1.54056 | 1.53665 |
| #2 | −10.730 | 1.00 |  |  |  |
| #3 | ∞ | 4.00 | 1.52972 | 1.51383 | 1.51062 |
| #4 | ∞ | 1.00 |  |  |  |
| #5 | ∞ | 4.00 | 1.52972 | 1.51383 | 1.51062 |
| #6 | ∞ | 3.35 |  |  |  |
| #7 (1st region) | 1.951 |  |  |  |  |
| #7 (2nd region) | 1.903 | 1.95 | 1.56023 | 1.54056 | 1.53665 |
| #7 (3rd region) | 1.928 |  |  |  |  |
| #8 | −8.305 | 1.54 |  |  |  |
| #9 | ∞ | 0.60 | 1.62231 | 1.57982 | 1.57326 |
| #10 | ∞ | — |  |  |  |

TABLE 3

| Surface Number | r | d | n (405 nm) | n (657 nm) | n (785 nm) |
|---|---|---|---|---|---|
| #0 |  | 16.10 |  |  |  |
| #1 | 111.180 | 1.50 | 1.56023 | 1.54056 | 1.53665 |
| #2 | −9.970 | 1.00 |  |  |  |
| #3 | ∞ | 4.00 | 1.52972 | 1.51383 | 1.51062 |
| #4 | ∞ | 1.00 |  |  |  |
| #5 | ∞ | 4.00 | 1.52972 | 1.51383 | 1.51062 |
| #6 | ∞ | 3.26 |  |  |  |
| #7 (1st region) | 1.951 |  |  |  |  |
| #7 (2nd | 1.903 | 1.95 | 1.56023 | 1.54056 | 1.53665 |

TABLE 3-continued

| Surface Number | r | d | n (405 nm) | n (657 nm) | n (785 nm) |
|---|---|---|---|---|---|
| region) | | | | | |
| #7 (3rd region) | 1.928 | | | | |
| #8 | −8.305 | 1.63 | | | |
| #9 | ∞ | 0.60 | 1.62231 | 1.57982 | 1.57326 |
| #10 | ∞ | — | | | |

TABLE 4

| Surface Number | r | d | n (405 nm) | n (657 nm) | n (785 nm) |
|---|---|---|---|---|---|
| #0 | | 10.48 | | | |
| #1 | −23.940 | 1.50 | 1.56023 | 1.54056 | 1.53665 |
| #2 | −6.960 | 3.95 | | | |
| #3 | ∞ | 4.00 | 1.52972 | 1.51383 | 1.51062 |
| #4 | ∞ | 3.40 | | | |
| #5 (1st region) | 1.951 | | | | |
| #5 (2nd region) | 1.903 | 1.95 | 1.56023 | 1.54056 | 1.53665 |
| #5 (3rd region) | 1.928 | | | | |
| #6 | −8.305 | 1.49 | | | |
| #7 | ∞ | 1.20 | 1.62231 | 1.57982 | 1.57326 |
| #8 | ∞ | — | | | |

In Tables 2–4, "surface number" represents a surface number of each surface of optical components in the optical pick-up 100 shown in FIGS. 3A–3C. In Table 2, a surface #0 represents the light source 10A, surfaces #1 and #2 represent a front surface (a light source side surface) and a rear surface (an objective lens side surface) of the coupling lens 20A, respectively, and surfaces #9 and #10 represent the cover layer and the data recording layer of the optical disc D1, respectively. In Table 3, a surface #0 represents the light source 10B, surfaces #1 and #2 represent a front surface (a light source side surface) and a rear surface (an objective lens side surface) of the coupling lens 20B, respectively, and surfaces #9 and #10 represent the cover layer and the recording layer of the optical disc D2, respectively.

In each of Tables 2 and 3, surfaces #3 and #4 represent a front surface and a rear surface of the beam splitter 41, respectively, surfaces #5 and #6 represent a front surface and a rear surface of the beam splitter 42, respectively, and surfaces #7 and #8 represent the first surface 30a and a second surface 30b of the objective lens 30, respectively.

In Table 4, a surface #0 represents the light source 10C, and surfaces #1 and #2 represent a front surface (a light source side surface) and a rear surface (an objective lens side surface) of the coupling lens 20C, respectively. Surfaces #3 and #4 represent the front surface and the rear surface of the beam splitter 42, respectively. Surfaces #5 and #6 represent the first surface 30a and the second surface 30b of the objective lens 30, respectively. Surfaces #7 and #8 represent the cover layer and the data recording layer of the optical disc D3, respectively.

In Tables 2–4, "r" represents a radius of curvature (unit: mm) of each lens surface on the optical axis. "d" represents a thickness of a lens or a distance (unit: mm) from a lens surface to a next lens surface. "n" represents a refractive index which is indicated for each of wavelengths of 405 nm, 657 nm and 785 nm.

As shown in Tables 2–4, the first surface 30a of the objective lens 30 is divided into the first, second and third regions 31, 32 and 33 which are defined by heights h (mm) from the optical axis (Ax) of the objective lens 30 as follows.
First region 31: $h \leq 1.53$
Second region 32: $1.53 < h \leq 1.87$
Third region 33: $1.87 < h \leq 1.95$ Each of the rear surface (#2) of the coupling lens 20A, the rear surface (#2) of the coupling lens 20B, the rear surface (#2) of the coupling lens 20C and the first and second surfaces 30a and 30b of the objective lens 30 is an aspherical surface. The aspherical surface is expressed by a following equation:

$$X(h) = \frac{ch^2}{1 + \sqrt{1 - (1+K)c^2h^2}} + A_4 h^4 + A_6 h^6 + A_8 h^8 + A_{10} h^{10} + A_{12} h^{12}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4$, $A_6$, $A_8$, $A_{10}$ and $A_{12}$ are aspherical coefficients of fourth, sixth, eighth, tenth and twelfth orders, respectively.

Table 5 shows the conical coefficient and aspherical coefficients of the rear surface (#2) of the coupling lens 20A and the first and second surfaces 30a and 30b (#7 and #8) of the objective lens 30 when the optical disc D1 (the first laser beam) is used. Table 6 shows the conical coefficient and aspherical coefficients of the rear surface (#2) of the coupling lens 20B and the first and second surfaces 30a and 30b (#7 and #8) of the objective lens 30 when the optical disc D2 (the second laser beam) is used. Table 7 shows the conical coefficient and aspherical coefficients of the rear surface (#2) of the coupling lens 20C and the first and second surfaces 30a and 30b (#5 and #6) of the objective lens 30 when the optical disc D3 (the third laser beam) is used.

TABLE 5

| Surface No. | #2 | #7 (FIRST REGION) | #7 (SECOND REGION) | #7 (THIRD REGION) | #8 |
|---|---|---|---|---|---|
| K | 0.0000 | −0.6500 | −0.6500 | −0.6500 | 0.0000 |
| A4 | 6.8926E−05 | 3.2250E−03 | 7.9870E−04 | 4.2110E−03 | 1.6250E−02 |
| A6 | 4.5010E−07 | 4.5700E−04 | 5.8680E−04 | −3.3660E−04 | −3.3700E−03 |
| A8 | 2.5560E−09 | 1.4340E−05 | −2.9430E−04 | −1.9250E−04 | 3.4710E−04 |

TABLE 5-continued

| Surface No. | #2 | #7 (FIRST REGION) | #7 (SECOND REGION) | #7 (THIRD REGION) | #8 |
|---|---|---|---|---|---|
| A10 | 1.5860E−11 | 8.7720E−06 | 7.5880E−05 | 7.7140E−05 | −1.6400E−05 |
| A12 | 0.0000E+00 | −3.5090E−06 | −1.1497E−05 | −1.1772E−05 | −5.6539E−07 |

TABLE 6

| Surface No. | #2 | #7 (FIRST REGION) | #7 (SECOND REGION) | #7 (THIRD REGION) | #8 |
|---|---|---|---|---|---|
| K | 0.0000 | −0.6500 | −0.6500 | −0.6500 | 0.0000 |
| A4 | 8.8885E−05 | 3.2250E−03 | 7.9870E−04 | 4.2110E−03 | 1.6250E−02 |
| A6 | 6.6760E−07 | 4.5700E−04 | 5.8680E−04 | −3.3660E−04 | −3.3700E−03 |
| A8 | 4.3250E−09 | 1.4340E−05 | −2.9430E−04 | −1.9250E−04 | 3.4710E−04 |
| A10 | 3.2340E−11 | 8.7720E−06 | 7.5880E−05 | 7.7140E−05 | −1.6400E−05 |
| A12 | 0.0000E+00 | −3.5090E−06 | −1.1497E−05 | −1.1772E−05 | −5.6539E−07 |

TABLE 7

| Surface No. | #2 | #5 (FIRST REGION) | #5 (SECOND REGION) | #5 (THIRD REGION) | #6 |
|---|---|---|---|---|---|
| K | 0.0000 | −0.6500 | −0.6500 | −0.6500 | 0.0000 |
| A4 | 6.9680E−05 | 3.2250E−03 | 7.9870E−04 | 4.2110E−03 | 1.6250E−02 |
| A6 | 1.3880E−06 | 4.5700E−04 | 5.8680E−04 | −3.3660E−04 | −3.3700E−03 |
| A8 | 2.4230E−08 | 1.4340E−05 | −2.9430E−04 | −1.9250E−04 | 3.4710E−04 |
| A10 | 5.5690E−10 | 8.7720E−06 | 7.5880E−05 | 7.7140E−05 | −1.6400E−05 |
| A12 | 0.0000E+00 | −3.5090E−06 | −1.1497E−05 | −1.1772E−05 | −5.6539E−07 |

In Tables 5–7 (and in the following similar Tables), a notation symbol E indicates that 10 is used as a radix and a right side value of E is used as an exponent.

The diffracting structure formed on the front surface 30a of the objective lens 30 is expressed by an optical path difference function Φ(h):

$$\Phi(h)=(P_2 h^2 + P_4 h^4 + P_6 h^6 + \ldots)m\lambda.$$

where $P_2$, $P_4$ and $P_6$ are coefficients of second, fourth and sixth orders, h represents a height from the optical axis, m represents a diffraction order, and λ represents a working wavelength. The optical path difference Φ(h) indicates a difference of an optical path length of a hypothetical ray of light which does not pass through the diffractive lens structure and an optical path length of a ray of light which is diffracted by the diffraction lens structure, at the height h from the optical axis. In other words, the optical path difference Φ(h) represents the additional optical path length of each ray of light which is diffracted by the diffractive lens structure. "m" represents the diffraction order at which the diffraction efficiency takes the maximum value.

Table 8 shows values of the coefficients of the optical path difference function Φ(h) applied to the diffracting structure formed on the first surface 30a of the objective lens 30.

TABLE 8

| coefficient | First Region 31 | Second Region 32 | Third Region 33 |
|---|---|---|---|
| P2 | −1.9282E+00 | 1.6951E+00 | 3.7260E−01 |
| P4 | 5.6180E−01 | −5.5990E−01 | 2.5820E−00 |
| P6 | 9.7580E−02 | −1.6090E−02 | −1.2700E+00 |

TABLE 8-continued

| coefficient | First Region 31 | Second Region 32 | Third Region 33 |
|---|---|---|---|
| P8 | 0.0000E+00 | −1.7590E−02 | 6.9890E−02 |
| P10 | 0.0000E+00 | 0.0000E+00 | 0.0000E+00 |
| P12 | 0.0000E+00 | 0.0000E+00 | 0.0000E+00 |

Table 9 shows the diffraction order m (at which the diffraction efficiency is maximized) in each of the first, second and third regions 31–33. Further, the diffraction orders m are indicated for each of the first, second and third laser beams in Table 9.

TABLE 9

| m | First laser | Second Laser | Third Laser |
|---|---|---|---|
| First region 31 | $2^{nd}$ | $1^{st}$ | $1^{st}$ |
| Second region 32 | $3^{rd}$ | $2^{nd}$ | — |
| Third region 33 | $1^{st}$ | — | — |

With regard to the objective lens 30 in the optical pick-up 100 according to the first example, f1×M1 is 0.000, f2×M2 is 0.000, and f3×M3 is −0.232. Therefore, the conditions (1), (2) and (3) are satisfied. Since in this example f1×NA1 is 1.95 and f2×NA2 is 1.87, the condition (4) is also satisfied.

Since the condition (4) is satisfied, the third region 33 is formed on the first surface 30A of the objective lens 30. In the third region 33, the diffraction efficiency of the first order diffracted light is maximized for the first laser beam. The diffraction order m (i.e., the first order) for the first laser beam in the third region 33 is different from the diffraction order m (i.e., the third order) for the first laser beam in the second region 32.

Since in the first example $\lambda 1/(n1-1): \lambda 3/(n3-1) \approx 1:2$, the relationship (6) is satisfied.

Figure 5:
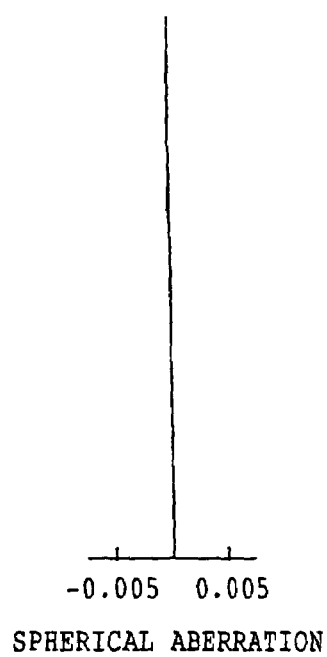
FIG. 5 is a graph showing a spherical aberration which is caused when the first optical disc is used.
Figure 6:
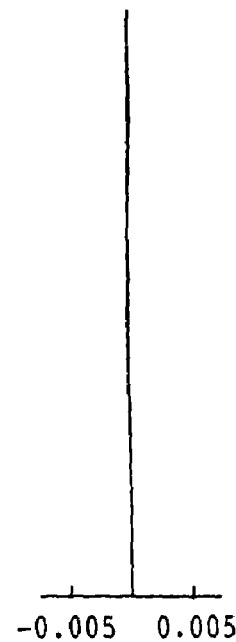
FIG. 6 is a graph showing the spherical aberration which is caused when the second optical disc is used.
Figure 7:
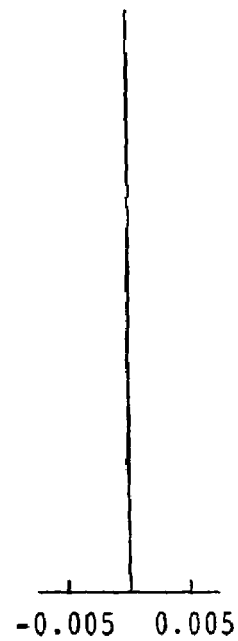
FIG. 7 is a graph showing the spherical aberration which is caused when the third optical disc is used.

FIG. 5 is a graph showing the spherical aberration which is caused when the optical disc D1 (e.g., HD DVD) is used. FIG. 6 is a graph showing the spherical aberration which is caused when the optical disc D2 (e.g., DVD) is used. Also, FIG. 7 is a graph showing the spherical aberration which is caused when the optical disc D3 (e.g., CD) is used. That is, FIGS. 5–7 show the spherical aberrations when the first, second and third laser beams pass through the objective lens 30, respectively. In each of FIGS. 5–7 (and the following similar graphs), a vertical axis represents a height from the optical axis, and a horizontal axis represents the amount of the aberration.

As shown in FIGS. 5–7, by satisfying the condition (6) and the conditions (1), (2) and (3), the spherical aberration is sufficiently corrected for all of the optical discs D1, D2 and D3, and therefore the suitable beam spot can be formed on each of the data recording layers of the optical discs D1, D2 and D3.

It is understood that variations of the first example can be made without departing from the scope and spirit of the invention. For example, the diffracting structure may be formed on the second surface 30b of the objective, lens 30 or on both of the first and second surfaces 30a and 30b of the objective lens 30.

Although in the first example the objective lens 30 is designed to have the numerical aperture of 0.601 for the second optical disc D2, the objective lens 30 may be designed to have a relatively high design numerical aperture of about 0.65 for the optical disc D2.

SECOND EXAMPLE

Figure 8A:
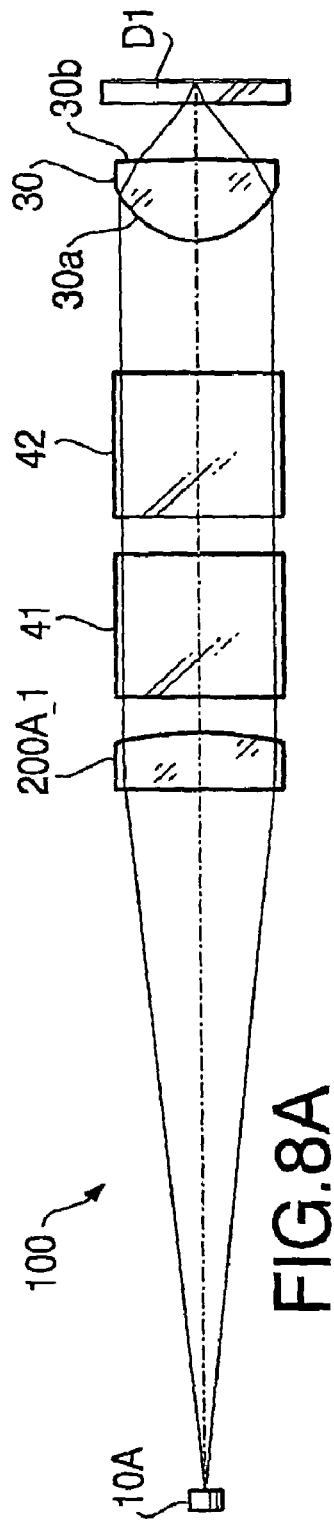
FIG. 8A shows a configuration of an optical pick-up according to a second example when the first optical disc is used.

The optical pick-up 100 according to a second example will be described. The optical pick-up 100 of the second example has the same configuration as that shown in FIG. 2. In this example, the coupling lens 20A and the coupling lens 20B have the same configuration. Therefore, in the following explanation, the coupling lens 20A is represented as a coupling lens 200A_1 and the coupling lens 20B is represented as a coupling lens 200A_2. FIG. 5A shows the configuration of the optical pick-up 100 according to the second example when the optical disc D1 is used. As shown in FIG. 8A, for recording data to and/or reproducing data from the optical disc D1, the light source 10A is used to emit the first laser beam. The first laser beam emitted by the light source 10A passes through the coupling lens 200A_1, and then incident on the objective lens 30 via the beam splitters 41 and 42.

Figure 8B:
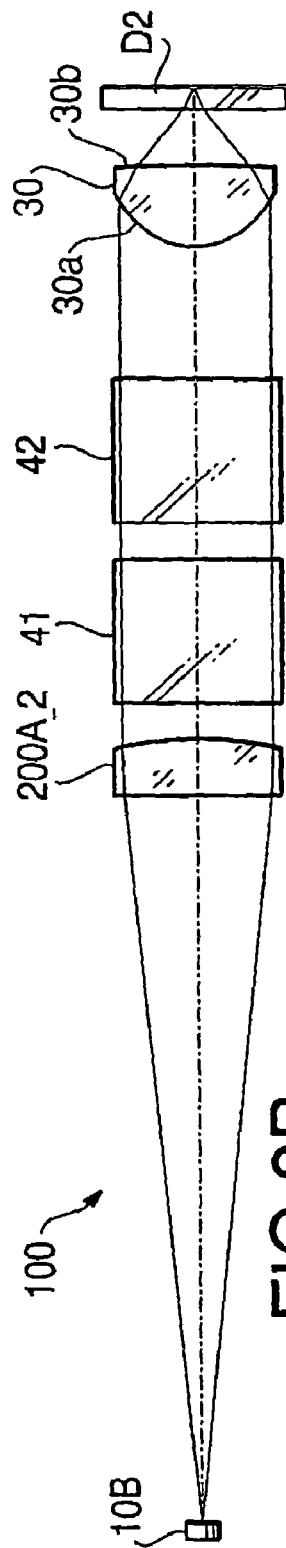
FIG. 8B shows the configuration of the optical pick-up according to the second example when the second optical disc is used.

FIG. 8B shows the configuration of the optical pick-up 100 according to the second example when the optical disc D2 is used. As shown in FIG. 8B, for recording data to and/or reproducing data from the optical disc D2, the light source 10B is used to emit the second laser beam. The second laser beam emitted by the light source 10B passes through the coupling lens 200A_2, and then incident on the objective lens 30 via the beam splitters 41 and 42.

Figure 8C:
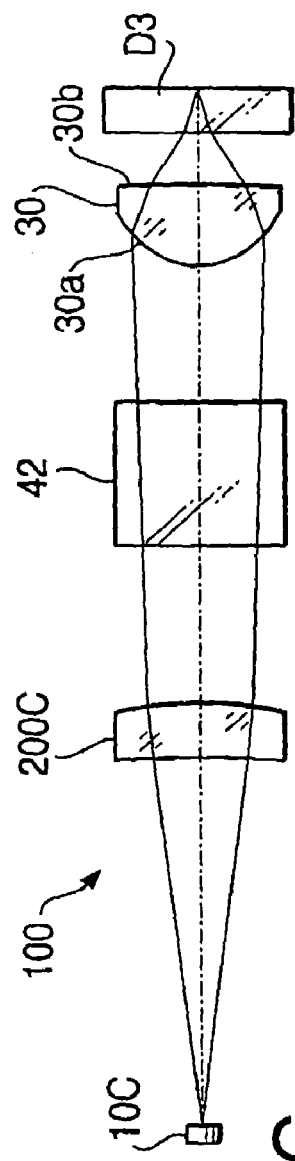
FIG. 8C shows the configuration of the optical pick-up according to the second example when the third optical disc is used.

FIG. 8C shows the configuration of the optical pick-up 100 according to the second example when the optical disc D3 is used. As shown in FIG. 8C, for recording data to and/or reproducing data from the optical disc D3, the light source 10C is used to emit the third laser beam. The third laser beam emitted by the light source 10C passes through a coupling lens 200C, and then incident on the objective lens 30 via the beam splitter 42.

Similarly to Table 1 of the first example, Table 10 shows performance specifications of the objective lens 30 according to the second example. Symbols shown in Table 10 have the same meanings as those of Table 1.

TABLE 10

|  | First laser beam | Second laser beam | Third laser beam |
|---|---|---|---|
| Design wavelength | 405 nm | 657 nm | 785 nm |
| f Focal length | 3.000 mm | 3.108 mm | 3.124 mm |
| NA | 0.650 | 0.628 | 0.500 |
| magnification | 0.000 | 0.000 | −0.076 |

Table 11 shows a numerical configuration of the optical pick-up 100 when the optical disc D1 (the first laser beam) is used, Table 12 shows a numerical configuration of the optical pick-up 100 when the optical disc D2 (the second laser beam) is used, and Table 13 shows a numerical configuration of the optical pick-up 100 when the optical disc D3 (the third laser beam) is used.

TABLE 11

| Surface Number | r | d | n (405 nm) | n (657 nm) | n (785 nm) |
|---|---|---|---|---|---|
| #0 |  | 19.10 |  |  |  |
| #1 | 178.260 | 1.50 | 1.56023 | 1.54056 | 1.53665 |
| #2 | −11.920 | 1.00 |  |  |  |
| #3 | ∞ | 4.00 | 1.52972 | 1.51383 | 1.51062 |
| #4 | ∞ | 1.00 |  |  |  |
| #5 | ∞ | 4.00 | 1.52972 | 1.51383 | 1.51062 |
| #6 | ∞ | 3.59 |  |  |  |
| #7 (1st region) | 1.955 | 2.20 | 1.56023 | 1.54056 | 1.53665 |
| #7 (2nd region) | 1.898 |  |  |  |  |
| #8 | −7.685 | 1.40 |  |  |  |
| #9 | ∞ | 0.60 | 1.62231 | 1.57982 | 1.57326 |
| #10 | ∞ | — |  |  |  |

TABLE 12

| Surface Number | r | d | n (405 nm) | n (657 nm) | n (785 nm) |
|---|---|---|---|---|---|
| #0 |  | 19.81 |  |  |  |
| #1 | 178.260 | 1.50 | 1.56023 | 1.54056 | 1.53665 |
| #2 | −11.920 | 1.00 |  |  |  |
| #3 | ∞ | 4.00 | 1.52972 | 1.51383 | 1.51062 |
| #4 | ∞ | 1.00 |  |  |  |
| #5 | ∞ | 4.00 | 1.52972 | 1.51383 | 1.51062 |
| #6 | ∞ | 3.50 |  |  |  |
| #7 (1st region) | 1.955 | 2.20 | 1.56023 | 1.54056 | 1.53665 |
| #7 (2nd region) | 1.898 |  |  |  |  |
| #8 | −7.685 | 1.49 |  |  |  |
| #9 | ∞ | 0.60 | 1.62231 | 1.57982 | 1.57326 |
| #10 | ∞ | — |  |  |  |

TABLE 13

| Surface Number | r | d | n (405 nm) | n (657 nm) | n (785 nm) |
|---|---|---|---|---|---|
| #0 | | 10.18 | | | |
| #1 | −22.500 | 1.50 | 1.56023 | 1.54056 | 1.53665 |
| #2 | −6.780 | 4.35 | | | |
| #3 | ∞ | 4.00 | 1.52972 | 1.51383 | 1.51062 |
| #4 | ∞ | 3.64 | | | |
| #5 (1st region) | 1.955 | 2.20 | 1.56023 | 1.54056 | 1.53665 |
| #5 (2nd region) | 1.898 | | | | |
| #6 | −7.685 | 1.35 | | | |
| #7 | ∞ | 1.20 | 1.62231 | 1.57982 | 1.57326 |
| #8 | ∞ | — | | | |

Similarly to Tables 2–4, in each of Tables 11–13 "surface number" represents a surface number of each surface of optical components in the optical pick-up 100 shown in FIGS. 8A–8C. In Table 11, a surface #0 represents the light source 10A, surfaces #1 and #2 represent a front surface (a light source side surface) and a rear surface (an objective lens side surface) of the coupling lens 200A_1, respectively, and surfaces #9 and #10 represent the cover layer and the data recording layer of the optical disc D1, respectively. In Table 12, a surface #0 represents the light source 10B, surfaces #1 and #2 represent a front surface (a light source side surface) and a rear surface (an objective lens side surface) of the coupling lens 200A_2, respectively, and surfaces #9 and #10 represent the cover layer and the recording layer of the optical disc D2, respectively.

In Tables 11 and 12, surfaces #3 and #4 represent the front surface and the rear surface of the beam splitter 41, respectively, surfaces #5 and #6 represent the front surface and the rear surface of the beam splitter 42, respectively, and surfaces #7 and #8 represent the first surface 30a and the second surface 30b of the objective lens 30, respectively.

In Table 13, a surface #0 represents the light source 10C, and surfaces #1 and #2 represent a front surface (a light source side surface) and a rear surface (an objective lens side surface) of the coupling lens 200C, respectively. Surfaces #3 and #4 represent the front surface and the rear surface of the beam splitter 42, respectively. Surfaces #5 and #6 represent the first surface 30a and the second surface 30b of the objective lens 30, respectively. Surfaces #7 and #8 represent the cover layer and the data recording layer of the optical disc D3, respectively. Other symbols in Tables 11–13 have the same meanings as those of Tables 2–4.

As shown in Tables 11–13, the first surface 30a of the objective lens 30 is divided into the first and second regions 31 and 32. The objective lens 30 does not have the third region 33 because in this example both of the conditions (4) and (5) are not satisfied. In this example, the regions 31 and 32 are defined by heights h (mm) from the optical axis (Ax) of the objective lens 30 as follows.

First region 31: h ≦ 1.70
Second region 32: 1.70 < h ≦ 1.95

Each of the rear surface (#2) of the coupling lens 200A_1 (200A_2), the rear surface (#2) of the coupling lens 200C and the first and second surfaces 30a and 30b of the objective lens 30 is an aspherical surface which is defined by the above mentioned expression of the SAG amount X(h).

Table 14 shows the conical coefficients and aspherical coefficients of the rear surface (#2) of the coupling lens 200A_1 (200A_2) and the first and second surfaces 30a and 30b (#7 and #8) of the objective lens 30 when the optical disc D1 (the first laser beam) or D2 (the second laser beam) is used. Table 15 shows the conical coefficient and aspherical coefficients of the rear surface (#2) of the coupling lens 200C and the first and second surfaces 30a and 30b (#5 and #6) of the objective lens 30 when the optical disc D3 (the third laser beam) is used.

TABLE 14

| Surface No. | #2 | #7 (FIRST REGION) | #7 (SECOND REGION) | #8 |
|---|---|---|---|---|
| K | 0.0000 | −0.6500 | −0.6500 | 0.0000 |
| A4 | 5.0360E−05 | 3.6100E−03 | 1.1540E−03 | 2.2320E−02 |
| A6 | 2.6630E−07 | 4.4450E−04 | 9.5260E−04 | −6.0320E−03 |
| A8 | 1.2250E−09 | 7.3950E−05 | −4.4110E−04 | 1.8060E−03 |
| A10 | 0.0000E+00 | −4.9490E−06 | 1.0250E−04 | −3.5150E−04 |
| A12 | 0.0000E+00 | 3.7492E−06 | −6.5223E−06 | 2.8115E−05 |

TABLE 15

| Surface No. | #2 | #5 (FIRST REGION) | #5 (SECOND REGION) | #6 |
|---|---|---|---|---|
| K | 0.0000 | −0.6500 | −0.6500 | 0.0000 |
| A4 | 7.2350E−05 | 3.6100E−03 | 1.1540E−03 | 2.2320E−02 |
| A6 | 1.5350E−06 | 4.4450E−04 | 9.5260E−04 | −6.0320E−03 |
| A8 | 2.8170E−08 | 7.3950E−05 | −4.4110E−04 | 1.8060E−03 |
| A10 | 0.0000E+00 | −4.9490E−06 | 1.0250E−04 | −3.5150E−04 |
| A12 | 0.0000E+00 | 3.7492E−06 | −6.5223E−06 | 2.8115E−05 |

Table 16 shows values of the coefficients of the optical path difference function $\Phi(h)$ applied to the diffracting structure formed on the first surface 30a of the objective lens 30 according to the second example.

TABLE 16

| coefficient | First Region 31 | Second Region 32 |
|---|---|---|
| P2 | −2.2908E+00 | 2.0143E+00 |
| P4 | 5.3530E−01 | −3.6970E−01 |
| P6 | 6.9580E−02 | −1.1695E−01 |
| P8 | 8.1600E−03 | 0.0000E+00 |
| P10 | 0.0000E+00 | 0.0000E+00 |
| P12 | 0.0000E+00 | 0.0000E+00 |

Table 17 shows the diffraction order m (at which the diffraction efficiency takes the maximum value) in each of the first and second regions 31 and 32. In Table 17, the diffraction orders m are indicated for each of the first, second and third laser beams.

TABLE 17

| M | First laser | Second laser | Third Laser |
|---|---|---|---|
| First region 31 | 2nd | 1st | 1st |
| Second region 32 | 3rd | 2nd | — |

With regard to the objective lens 30 in the optical pick-up 100 according to the second example, f1×M1 is 0.000, f2×M2 is 0.00, and f3×M3 is −0.237. Therefore, the conditions (1), (2) and (3) are satisfied. Since in this example f1×NA1 is 1.95 and f2×NA2 is 1.95, both of the conditions (4) and (5) are not satisfied, and therefore the third region 33 is not formed on the first surface 30a of the objective lens 30.

Since in the second example λ1/(n1−1): λ3/(n3−1) 1: 2, the relationship (6) is satisfied.

FIG. 9 is a graph showing the spherical aberration which is caused when the optical disc D1 (e.g. HD DVD) is used. FIG. 10 is a graph showing the spherical aberration which is caused when the optical disc D2 (e.g., DVD) is used. Also, FIG. 11 is a graph showing the spherical aberration which is caused when the optical disc D3 (e.g., CD) is used. That is, FIGS. 9–11 show the spherical aberrations when the first, second and third laser beams pass through the objective lens 30, respectively.

As shown in FIGS. 9–11, by satisfying the condition (6) and the conditions (1), (2) and (3), the spherical aberration is sufficiently corrected for all of the optical discs D1, D2 and D3, and therefore the suitable beam spot can be formed on each of the data recording layers of the optical discs D1, D2 and D3.

Although the present invention has been described in considerable detail with reference to certain preferred embodiments thereof, other embodiments are possible.

The present disclosure relates to the subject matter contained in Japanese Patent Application No. P2003-159309, filed on Jun. 4, 2003, which is expressly incorporated herein by reference in its entirety.

What is claimed is:

1. An objective lens for an optical pick-up which is used to record data to and/or to reproduce data from at least three types of optical discs by selectively using one of at least three light beams having different wavelengths, the at least three types of optical discs having at least two different thicknesses of cover layers, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 being substantially equal to 0.6 mm, t2 being substantially equal to 0.6 mm, and t3 being substantially equal to 1.2 mm, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship NA1≧NA2>NA3 being satisfied, when the first and second optical discs are used, substantially collimated light beams of the first and second light beams being incident on the objective lens, respectively, when the third optical disc is used, a diverging beam of the third light beam being incident on the objective lens, given that magnification and a focal length of the objective lens are respectively represented by M1 and f1 when the first optical disc is used, the magnification and the focal length of the objective lens are respectively represented by M2 and f2 when the second optical disc is used, and the magnification and the focal length of the objective lens are respectively represented by M3 and f3 when the third optical disc is used, following conditions (1), (2) and (3) being satisfied:

$$-0.02 < f1 \times M1 < 0.02 \qquad (1)$$

$$-0.02 < f2 \times M2 < 0.02 \qquad (2)$$

$$-0.29 < f3 \times M3 < -0.19 \qquad (3),$$

at least one of lens surfaces of the objective lens comprising a diffracting structure having a first region for converging the third light beam on a data recording layer of the third optical disc, the diffracting structure within the first region being configured such that a diffraction order at which diffraction efficiency of the first light beam is maximized is a second order and that diffraction orders at which diffraction efficiency of the second and third light beams are maximized are first orders.

2. The objective lens according to claim 1, wherein the diffracting structure has a second region which converges the first and second light beams on data recording layers of the first and second optical discs, respectively, and does not contribute to converging the third light beam, the diffracting structure within the second region being configured such that a diffraction order at which diffraction efficiency of the first light beam is maximized is a third order and that a diffraction order at which diffraction efficiency of the second light beam is maximized is a second order.

3. The objective lens according to claim 2, wherein the objective lens satisfies a condition:

$$f1 \times NA1 > f2 \times NA2 \qquad (4),$$

wherein the diffracting structure has a third region which converges only the first light beam on the data recording layer of the first optical disc and which is located outside the second region, the diffracting structure within the third region being configured such that a diffraction order at which diffraction efficiency of the first light beam is maximized is different from the diffraction order at which the diffraction efficiency of the first light beam is maximized within the second region.

4. The objective lens according to claim 2, wherein the objective lens satisfies a condition:

$$f1 \times NA1 < f2 \times NA2 \qquad (5),$$

wherein the diffracting structure has a third region which converges only the second light beam on the data recording layer of the second optical disc and which is located outside the second region, the diffracting structure within the third region being configured such that a diffraction order at which diffraction efficiency of the second light beam is maximized is different from the diffraction order at which the diffraction efficiency of the second light beam is maximized within the second region.

5. The objective lens according to claim 2, wherein the first region is located on the at least one of lens surfaces of the objective lens to include an optical axis of the objective lens, wherein the second region is formed outside the first region.

6. The objective lens according to claim 1, wherein the first region is located on the at least one of lens surfaces of the objective lens to include an optical axis of the objective lens.

7. An optical pick-up used for recording data to and/or reproducing data from at least three types of optical discs having at least two different thicknesses of cover layers, comprising:

light sources capable of emitting at least three light beams having different wavelengths, one of the at least three light beams being selectively emitted when one of the at least three types of optical discs is used; and an objective lens, when a thickness of a first optical disc of the at least three types of optical discs to be used for recording data and/or reproducing data using a first light beam of the at least three light beams having a wavelength shortest of all the wavelengths of the at least three light beams is represented by t1, a thickness of a second optical disc of the at least three types of optical discs to be used for recording data and/or reproducing data using a second light beam of the at least three light beams having a wavelength longer than that of the first light beam is represented by t2, and a thickness of a third optical disc of the at least three types of optical discs to be used for recording data and/or reproducing data using a third light beam of the at least three light beams having a wavelength longest of all of the wavelengths of the at least three light beams is represented by t3, t1 being substantially equal to 0.6 mm, t2 being substantially equal to 0.6 mm and t3 being substantially equal to 1.2 mm, when a numerical aperture required for recording data to and/or reproducing data from the first optical disc is represented by NA1, a numerical aperture required for recording data to and/or reproducing data from the second optical disc is represented by NA2, and a numerical aperture required for recording data to and/or reproducing data from the third optical disc is represented by NA3, a relationship $NA1 \leq NA2 > NA3$ being satisfied, when the first and second optical discs are used, substantially collimated light beams of the first and second light beams being incident on the objective lens, respectively, when the third optical disc is used, a diverging beam of the third light beam being incident on the objective lens, given that magnification and a focal length of the objective lens are respectively represented by M1 and f1 when 63' the first optical disc is used, the magnification and the focal length of the objective lens are respectively represented by M2 and f2 when the second optical disc is used, and the magnification and the focal length of the objective lens are respectively represented by M3 and f3 when the first optical disc is used, following conditions (1), (2) and (3) being satisfied:

$$-0.02 < f1 \times M1 < 0.02 \quad (1)$$

$$-0.02 < f2 \times M2 < 0.02 \quad (2)$$

$$-0.29 < f3 \times M3 < -0.19 \quad (3),$$

at least one of lens surfaces of the objective lens comprising a diffracting structure having a first region for converging the third light beam on a data recording layer of the third optical disc, the diffracting structure within the first region being configured such that a diffraction order at which diffraction efficiency of the first light beam is maximized is a second order and that diffraction orders at which diffraction efficiency of the second and third light beams are maximized are first orders.

8. The optical pick-up according to claim 7,
wherein the diffracting structure of the objective lens has a second region which converges the first and second light beams on data recording layers of the first and second optical discs, respectively, and does not contribute to converging the third light beam, the diffracting structure within the second region being configured such that a diffraction order at which diffraction efficiency of the first light beam is maximized is a third order and that a diffraction order at which diffraction efficiency of the second light beam is maximized is a second order.

9. The optical pick-up according to claim 8,
wherein the objective lens satisfies a condition:

$$f1 \times NA1 > f2 \times NA2 \quad (4),$$

wherein the diffracting structure of the objective lens has a third region which converges only the first light beam on the data recording layer of the first optical disc and which is located outside the second region, the diffracting structure within the third region being configured such that a diffraction order at which diffraction efficiency of the first light beam is maximized is different from the diffraction order at which the diffraction efficiency of the first light beam is maximized within the second region.

10. The optical pick-up according to claim 8,
wherein the objective lens satisfies a condition:

$$f1 \times NA1 < f2 \times NA2 \quad (5),$$

wherein the diffracting structure of the objective lens has a third region which converges only the second light beam is located outside the second region, the diffracting structure within the third region being configured such that a diffraction order at which diffraction efficiency of the second light beam is maximized is different from the diffraction order at which the diffraction efficiency of the second light beam is maximized within the second region.

11. The optical pick-up according to claim 8,
wherein the first region is located on the at least one of lens surfaces of the objective lens to include an optical axis of the objective lens,
wherein the second region is formed outside the first region.

12. The optical pick-up according to claim 7,
wherein when wavelengths of the first and third light beams are respectively represented by $\lambda 1$ and $\lambda 3$, and refractive indexes of the objective lens for the first and third light beams are respectively represented by n1 and n3, a following relationship is satisfied:

$$\lambda 1/(n1-1) : \lambda 3/(n3-1) \approx 1:2 \quad (6).$$

13. The optical pick-up according to claim 7, wherein the first region is located on the at least one of lens surfaces of the objective lens to include an optical axis of the objective lens.

* * * * *